Patented Feb. 7, 1933

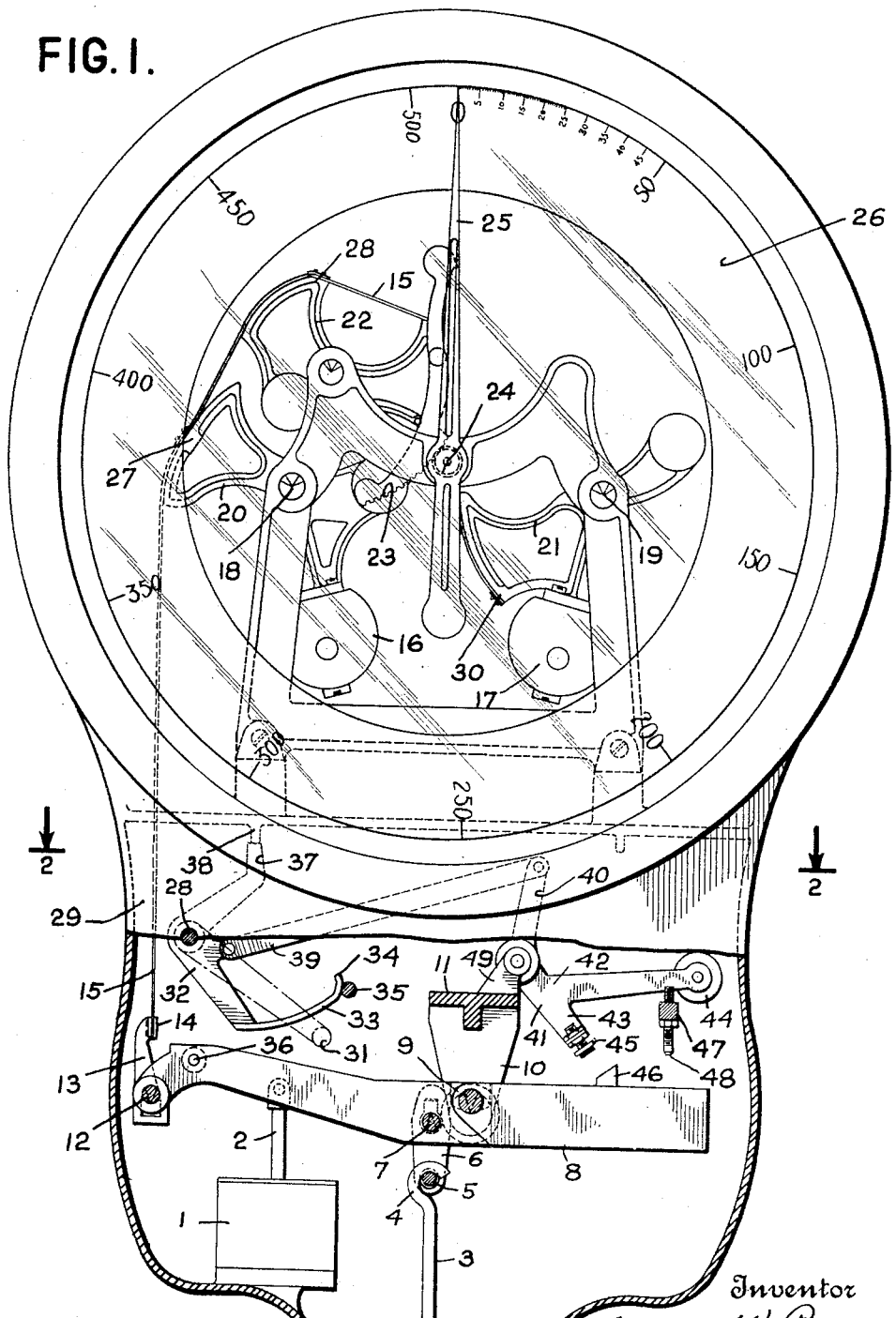
Feb. 7, 1933.    J. W. BRYCE    1,896,283
LOCK FOR WEIGHING SCALES
Filed Nov. 22, 1928    2 Sheets-Sheet 1
FIG. I.
Inventor
James W. Bryce
By his Attorney
W. M. Wilson Feb. 7, 1933.  J. W. BRYCE  1,896,283
LOCK FOR WEIGHING SCALES
Filed Nov. 22, 1928  2 Sheets-Sheet 2
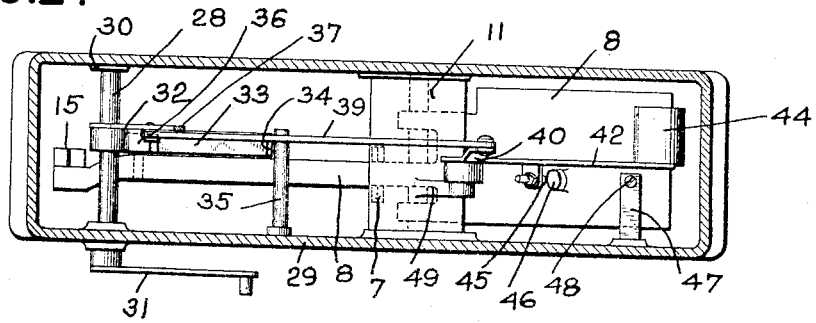
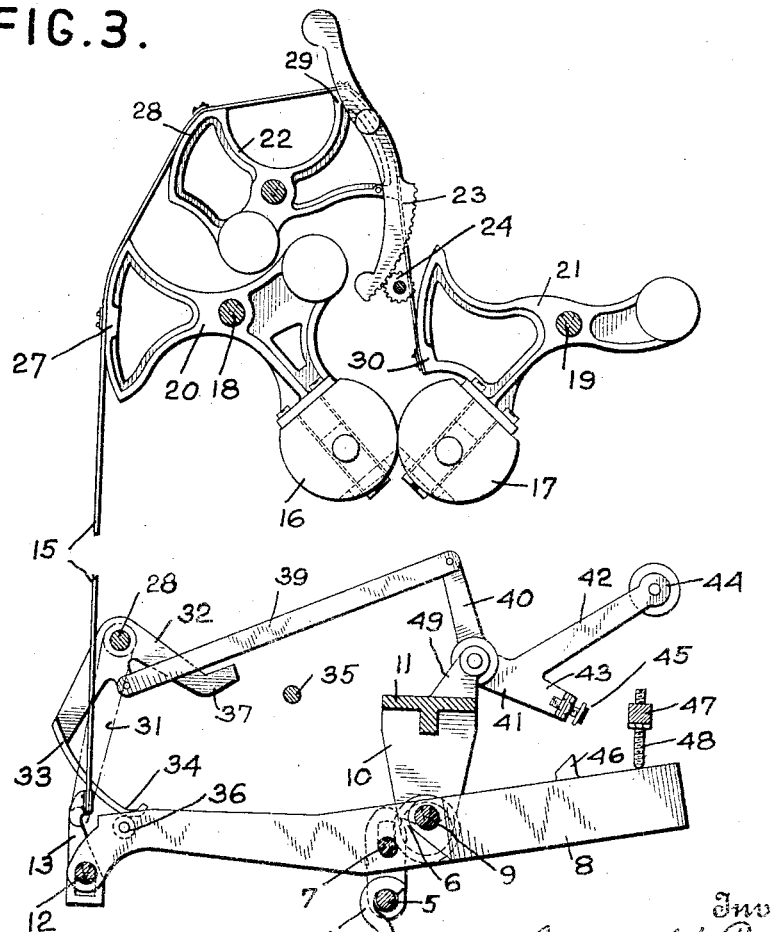

1,896,283

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

LOCK FOR WEIGHING SCALES

Application filed November 22, 1928. Serial No. 321,061.

The present invention relates to weighing scales and more particularly to a device for locking movable parts of the scale when the same is shipped or transported from one place to another. The invention is illustrated as applied to a transportable scale as described in my copending application Serial No. 150,735 filed November 26, 1926 and reference may be made to this application in respect to details of the scale which are not of essential importance in view of the scope of the present invention.

The main object of this invention is to provide a new and reliable locking device of simple structure for locking movable parts of a weighing scale against movement.

Another object of the invention is to provide means for limiting the movement of a counterbalancing system, said means being shiftable into or out of cooperable relationship to said system.

Still another object is to provide locking means for the counterbalancing system and means to limit its movement, both means being alternatively shiftable into cooperable relationship to said system.

Another object of the present invention is to provide means for restoring automatically said locking means to a certain position.

Another object is to engage the pendulums of a double pendulum scale to each other by said locking device so as to prevent movement of the pendulums.

Other objects and advantages will be hereinafter set forth in the accompanying specification and claims and illustrated in the drawings which show by way of illustration what is considered to be a preferred embodiment of the invention.

In the drawings:

Fig. 1 shows a front view of the counterbalancing and indicating part of a pendulum scale; the lower part being broken away to illustrate more clearly the device according to this invention.

Fig. 2 is a sectional view on line 2—2 of Fig. 1.

Fig. 3 shows the device according to this invention in its cooperation with the counterbalancing system and the scale beam respectively.

In the drawings reference numeral 3 designates a steelyard rod which is connected at its lower end with the load receiving mechanism or platform. A hook 4 engages shaft 5 which connects two side plates 6 having bearings resting upon knife edges 7 provided on the scale beam 8. This beam has knife edges 9 which rest in bearings 10 connected with each other by cross plate 11 fast to the housing of the scale. Numeral 1 designates the usual dash pot, the piston of which is connected through rod 2 with the beam 8.

The left hand arm of beam 8 (Figs. 1 and 3) carries knife edges 12 coacting with bearings of a connecting member 13; this member has a lug 14 to which is fastened a flexible tape 15 leading to the pendulum counterbalancing system.

There are provided two main pendulums 16 and 17 fastened to supports 20 and 21 which are carried by the frame of the scale on fulcrums 18 and 19. An auxiliary member generally designated with 22 is provided carrying a rack 23 which engages a pinion 24 fixed to the shaft which carries the indicator 25 which coacts with a dial 26. The tape 15 leads to a cam portion 27 of carrier 20, to which portion the tape is fastened, then to segmental parts 28, 29' and 30 of supports 22 and 21, the tape being fastened to each of these segments as shown in the drawings. It will be recognized that the pendulums move in opposite turning direction when a load draws rod 3 downward which force is transferred to the pendulum system which in turn counterbalances the load and moves the indicator 25 to indicate the offset load.

Now the device according to this invention will be explained. A shaft 28 has its bearings in the front plate 29 of the housing and in a bearing 30 attached to the rear plate. The shaft at the front end projects beyond the housing and is provided with a handle 31. Within the housing there is fixed to the shaft a bell crank lever 32. One arm of this lever carries a plate spring 33 having a bent terminal portion 34 which cooperates in the position shown in Fig. 1 with an arresting rod 35 while in the position shown in Fig. 3 it engages a lug 36 provided upon the left arm of scale beam 8. Experience has shown that a sufficiently reliable cooperation between the spring 33 and parts 35 and 36 may be secured if the outer side of terminal portion 34 is flattened but, of course, there may also be provided a slight recess which engages the round parts 35 and 36 to secure an absolutely safe cooperation. The other arm of bell crank lever 32 has a terminal 37 which encounters a lug 38 of the housing so as to prevent movement of spring 33 and portion 34 respectively beyond shaft 35 by the handle 31. To lever 32 is pivoted a link 39 which in turn is pivoted to one arm 40 of a member 41. This member is pivoted upon a post 49 on cross plate 11 and has two additional arms 42 and 43. The arm 42 carries a weight 44 which serves to automatically restore the linkage comprising lever 32, link 39 and member 41 to the position shown in Fig. 1 when the lever 32 has been moved by handle 31 from the position shown in Fig. 3 but not entirely restored so that spring 33 might engage shaft 35 (as illustrated in Fig. 1). The arm 43 has a lug portion carrying an adjustable stop screw 45 which is adapted to coact with a lug 46 provided upon the upper side of scale beam 8 (see also Fig. 2). The adjustment of member 41 relatively to handle 31 and of the stop screw 45 relatively to arm 43 is such that (assuming the parts are in the position of Fig. 1) lug 46 encounters screw 45 when the scale is loaded to capacity.

Stop 45 thus prevents damaging of the movable scale parts by overload, but the adjustment of the pendulums is such that they are not in engagement with each other when the scale beam 8 is in a position corresponding to capacity load though there is only a small distance between them. To the front plate 29 of the housing is fastened a bar 47 carrying an adjustable set screw 48. When the parts are in the position shown in Fig. 3, the spring 33 presses the left arm of beam 8 downwardly but the screw 48 prevents further counterclockwise movement of the beam thus locking the same in this position.

The cooperation of the several parts is as follows: Normally the handle 31 is in the position shown in Fig. 1, where spring 33 coacts with rod 35 thus holding the entire linkage in position. In this state the scale is ready for regular weighing operations but when an overload is put upon the load support, lug 46 will encounter screw 45 and the scale beam will be stopped against further movement.

When the scale is to be transported and the movable parts locked against movement, the handle 31 will be turned into the position shown in Fig. 3. During this turning the spring 33 will encounter stud 36 fast to the scale beam and turn the beam until its right arm encounters stop screw 48 and prevents further movement of the beam. It will be seen that by turning handle 31 the link 39 will turn member 41 in counterclockwise direction, thus removing stop 45 from the path of lug 46 (see Fig. 3) so that only stop 48 may cooperate with the scale beam.

When handle 31 is moved to its extreme left position (as viewed in Fig. 3) further movement then being prevented by the side walls of the housing (see Fig. 1) spring 33 will be tensioned and consequently will press the right arm of lever 8 firmly against stop 48 and this tension also holds the linkage in position.

By turning the beam 8 counterclockwise to its extreme position, the tape 15 moves the pendulums 16 and 17 towards each other and in the extreme position as shown in Fig. 3 they will engage each other. The fulcrums of supports 20 and 22 will be pressed towards their bearings while the fulcrum 19 of support 21 will be slightly lifted. It will be recognized that the pendulums are then prevented from movement in either direction and that also all remaining parts are firmly locked against any movement.

While there has been shown and described and pointed out the fundamental novel features of the invention as applied to a single modification and a particular scale it will be understood that it may be applied as well to other kinds of scales and it is obvious that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a weighing scale, a movable scale beam coacting with a counterbalancing system, a stop member for said beam, a linkage having a flexible spring strip cooperable with said scale beam and hand operated means connected with said linkage to lock said beam against movement by means of said stop member and said flexible spring strip.

2. In a weighing scale, a pivotally mounted scale beam coacting with a counterbalancing system, a stop member for said beam, said member being attached to a fixed part of the scale at one side of the pivot of said beam, a linkage having a resilient member cooperable with said scale beam on the other side of its pivot and hand operated means connected with said linkage to engage said resilient member to one arm of said beam and to engage the other arm with said stop member to lock said beam against movement.

3. In a weighing scale a pivotally mounted scale beam coacting with a counterbalancing system, a linkage shiftable into one position to lock said beam against movement and shiftable into another position to release said beam for free movement and means to restore said linkage to said second position when the linkage is in an intermediate position.

4. A weighing scale according to the preceding claim, wherein said restoring means comprise a balance weight.

5. In a weighing scale, a pivotally mounted scale beam coacting with a counterbalancing system, a stop member for said beam, said member being attached to a fixed part of the scale at one side of the pivot of said beam, a linkage having a resilient member cooperable with said scale beam on the other side of its pivot and having another stop element for limiting the movement of said beam at the other side of its pivot and hand operated means connected with said linkage and being shiftable into different positions to engage said resilient member to one arm of said beam and to engage the other arm with said stop member to lock said beam against movement in one position of said hand operated means and to release said beam and to adjust said movement limiting stop element for the beam into cooperable relationship to the beam in another position of said hand operated means.

6. In a weighing scale, a scale beam controlled by a load receiving device, a double pendulum system and flexible means to connect both pendulums with each other and one pendulum with the scale beam, a member for stopping the movement of the scale beam in an extreme position, both pendulums being so arranged as to engage each other in said extreme position of the beam to prevent further movement of each pendulum in one of its oscillating directions and means for locking said beam in said extreme position to prevent return movement of each pendulum in its other oscillating direction.

7. A weighing scale according to the preceding claim wherein said locking means include a hand operated and pivotally mounted lever having a spring plate which cooperates with a lug on said scale beam for locking operation.

8. In a weighing scale, a scale beam coacting with a counterbalancing system, means cooperable with one arm of the beam for locking said scale beam against movement in one direction, means cooperable with the other arm of the beam for limiting the movement of said beam when unlocked, and hand operated means common to said locking means and movement limiting means for alternatively engaging said locking means with said scale beam to lock the same against movement and to disengage said movement limiting means from cooperable relationship with said beam or to disengage said locking means to allow free movement of the beam and to engage said movement limiting means into cooperable relationship with said beam.

9. In a scale, a beam, a load responsive element for moving one end of the beam downwardly upon a weighing operation, pendulums connected to the beam to be moved towards each other upon aforesaid end of the beam moving downwardly, a linkage including an element movable in one direction for engaging the beam to move aforesaid end of the beam downwardly to an extent sufficient to engage the pendulums with each other, and a stationary element against which the beam is moved by said first-named element when the latter moves in aforesaid direction whereby the beam is locked against weighing operation between said elements.

10. The scale as defined in claim 9; said first-named element being movable in the opposite direction to release the beam and said linkage including a device for limiting movement of the beam when the latter is released by said first-named element for weighing operation.

In testimony whereof I hereto affix my signature.

JAMES W. BRYCE.